Nov. 24, 1964 P. IRIBE 3,158,861
METHOD AND APPARATUS FOR TESTING A RADAR TRACKING SERVO
Filed April 4, 1963

INVENTOR.
Paul Iribe
BY
H. H. Losch
Paul S. Collignon
Att'ys.

United States Patent Office 3,158,861
Patented Nov. 24, 1964

3,158,861
METHOD AND APPARATUS FOR TESTING A RADAR TRACKING SERVO
Paul Iribe, Highland, Md., assignor, by mesne assignments, to the United States of America as represented by the Secretary of the Navy
Filed Apr. 4, 1963, Ser. No. 270,771
4 Claims. (Cl. 343—17.7)

The present invention relates to a tracking radar antenna and more particularly to a method and apparatus for testing a tracking servo without using radiation.

It is often desirable to test a tracking servo of a radar system before the transmitter and receiver have been completed, or under circumstances which make a radiating test difficult to perform. For example, it may be desirable to test an angle tracking system while the antenna is mounted on a vibration machine, and it may not be feasible to make a radiating test.

In the present invention, the servo test is conducted by using an inversion of the concept of a conical scanning antenna power pattern illuminating a slowly moving target, that is a slowly moving antenna pattern is illuminated by a conical scanning target. A rotating spot of light issuing from a spinning feedhorn shines through a photographic plate onto a photo-electric pick-up. The rotating spot of light issuing from the spinning feedhorn may be though of as a rotating target viewed by a stationary antenna. The photographic plate is previously exposed and developed in such a way that the two way antenna power pattern appears on it as a changing density of the emulsion. The photographic pattern is symmetrical along all radii from the center of the pattern and simulates the antenna power pattern as measured in any plane taken perpendicularly to the boresight. If the photographic pattern is scanned from edge to edge by a spot of light the photo-electric pick-up will produce a voltage which represents the actual power pattern when plotted versus the scanning position of the light spot. As the rotating spot shines through the photographic plate, the varying emulsion density will modulate the light intensity in the same manner as the target return is modulated by the two way antenna power pattern.

It is therefore a general object of the present invention to provide a new and improved method of testing the angle tracking system of a radar.

Another object of the present invention is to provide a method of testing the tracking servo of a radar system without using a radar transmitter.

Still another object of the present invention is to provide an improved method of testing a tracking servo of a radar system by providing a rotating spot of light that shines through a photographic plate of varying emulsion density which will modulate the light intensity in the same manner as a target return is modulated by a two way antenna power pattern.

Other objects and advantages of the present invention will be readily appreciated as the same becomes better understood by reference to the following detailed description when considered in connection with the accompanying drawing wherein.

Figure 1:
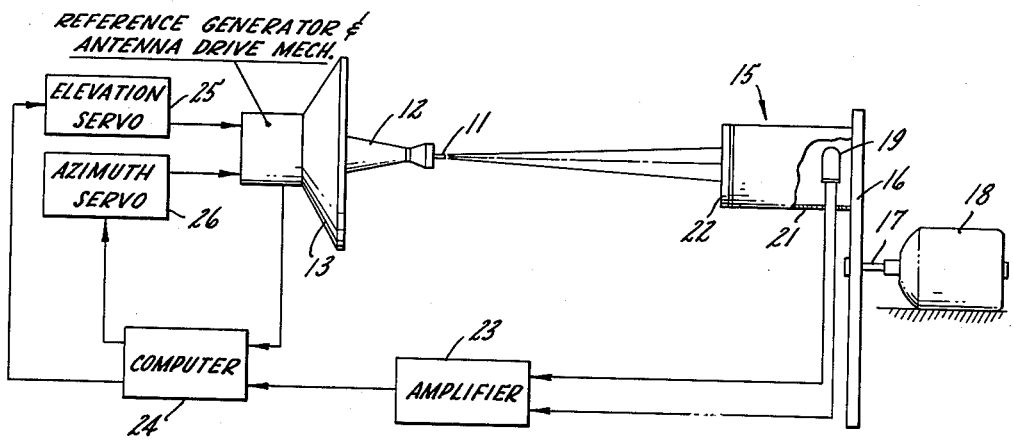
FIGURE 1 is a diagrammatic view showing a preferred embodiment of a test apparatus for practicing the method of the present invention.

Referring now to the drawing, there is shown in FIGURE 1 a test apparatus set-up for testing the angle tracking servo of a radar antenna. A light source 11 is attached to the spinning feedhorn 12 of a conical antenna 13. When antenna 13 is in operation, a beam 14 is nutated so that the center of the beam follows a scan circle, as shown in FIGURE 3 of the drawing.

Figure 3:
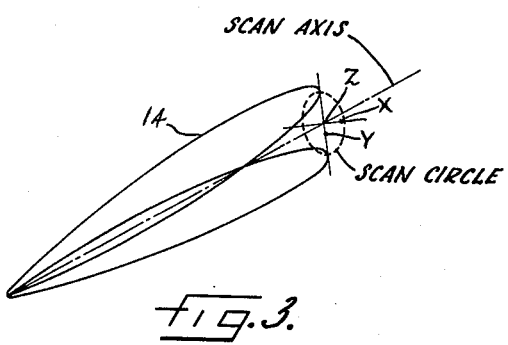
FIGURE 3 is a diagrammatic view showing a scanning radar beam.
Figure 4:
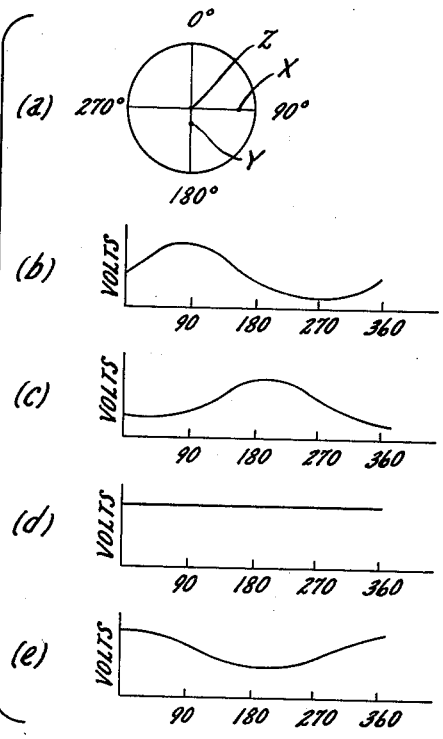
FIGURE 4 is a graphic illustration showing variations in voltage developed by movement of a scanning radar beam.

Referring now to FIGURES 3 and 4 of the drawing, if a receiver were placed on the scan axis, the signal strength measured by the receiver would be constant as the beam circles the axis in its scan. When the receiver is displaced from the axis, the amplitude of the received signal is modulated at the scan frequency of the scanning antenna. When the receiver is displaced from the scan axis at point "X," a sine wave modulation is observed in the amplitude of the received signal, with the maximum signal amplitude being at ninety degrees as shown in FIGURE 4(b). When the receiver is displaced from the scan axis at point "Y," the amplitude is reduced, as the distance from the scan axis has been shortened, and the phase of the modulation has changed so that the maximum amplitude of the received signal is at 180 degrees as shown in FIGURE 4(c). When the receiver antenna is aligned with the scan axis, which is represented as point "Z" in FIGURE 4(a), the received signal is constant and no modulation exists, as shown in FIGURE 4(d).

Figure 2:
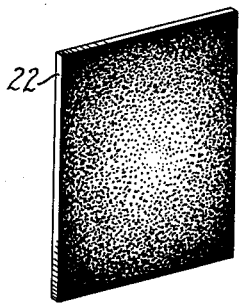
FIGURE 2 is a perspective view showing a photographic plate of varying emulsion density.

Referring now to FIGURES 1 and 2 of the drawing, receiver 15 is attached, by any conventional means, to a disk 16 that is connected on shaft 17 of motor 18. Receiver 15 is comprised of a photo-electric tube 19 that is positioned in housing 21, and a photographic plate 22 that is positioned on the end of housing 21. As shown in FIGURE 2 of the drawing, the photographic plate 22 is previously exposed and developed in such a way that the two way antenna power pattern appears on it as a changing density of the emulsion. The photographic pattern is symmetric along all radii from the center of the pattern and simulates the antenna power pattern as measured in any plane taken perpendicularly to the boresight. The output of receiver 15 is amplified by amplifier 23 and is then fed to computer 24. The rotation of the light spot from light source 11 is synchronized with the spin frequency reference generator, since it is caused by the feedhorn rotation. The output voltage of the reference generator provides a reference modulation as shown in FIGURE 4(e) and this voltage is also fed to computer 24. The combination of the signal from receiver 15 and the signal from the reference generator represents the error, expressed in polar coordinates, of the antenna 13. Computer 24 converts this error information into rectangular coordinates which then represents elevation error and azimuth error, and these errors are then fed to an elevation servo 25 and an azimuth servo 26, respectively. Computers for converting polar information into rectangular form are well-known in the radar and fire control art and comprise means for multiplying the amplitude of the error by the sine of the angle for one coordinate and by the cosine of the angle for the other coordinate. One type of mechanical vector solver is shown in U.S. Patent 2,412,443, issued December 10, 1946, to R. F. Crooke, and one type of electrical vector solver is shown in U.S. Patent 2,553,-529, issued May 15, 1951, to R. C. Dehmel.

In operation, light source 11 is turned on and feedhorn 12 nutated, which causes a beam of light to be rotated in a scan circle, as shown in FIGURE 3 of the drawing. This beam of light passes through plate 22, which is of varying density, and is picked-up by photo-electric tube 19. Tube 19 provides a voltage proportional to the amount of light that passes through plate 22. When the beam of light is positioned at the center of plate 22, the maximum amount of light is passed through to tube 19 and when the beam of light is positioned at the edge of plate 22, the least amount of light is passed through to tube 19. The output of tube 19 is amplified and then fed to computer 24, which is also fed a reference voltage from the reference generator. These two voltages are combined and resolved into an elevation error signal and an azimuth error signal which are fed to the elevation servo 25 and azimuth servo 26, respectively, which will drive antenna 13 so that the scan circle is positioned on the center of plate 22 and tube 19 receives the maximum amount of light.

Motor 18 can now be energized which causes disk 16, and consequently receiver 15, to be rotated. As the beam of light is displaced from the center of plate 22, the voltage output of tube 19 will change which will cause the elevation servo and azimuth servo to drive antenna 13 so that it seeks the center of plate 22. Thus as receiver 15 is moved, the antenna will track which will indicate that the servos are operating properly. In the event that either of the servos are not functioning, it will become readily apparent that the antenna is not tracking the receiver 15.

By periodically reversing the direction of rotation of motor 18, as for example by the use of cams and switches, disk 16 can readily be caused to slowly oscillate over any desired arc, rather than to rotate a full revolution. The operation of the system, however, will remain unchanged.

It can thus be seen that the present invention provides a dynamic test of antenna servos without requiring any RF energy to be radiated from the antenna.

Obviously many modifications and variations of the present invention are possible in the light of the above teachings. It is therefore to be understood, that within the scope of the appended claims, the invention may be practiced otherwise than as specifically described.

What is claimed is:

1. A test apparatus for testing the elevation and azimuth servos of a radar antenna having a nutating feedhorn comprising,
    means attached to said feedhorn for generating a beam of light,
    means for modulating said beam of light comprising a plate having deposited thereon an emulsion of variable density,
    means for receiving a modulated beam of light and providing an output voltage proportional to the amount of light received, and
    means for resolving said output voltage into an elevation error signal and an azimuth error signal, said signals being applied to said elevation servo and said azimuth servo, respectively, to drive said antenna.

2. A test apparatus for testing the elevation and azimuth servos of a nutating feedhorn comprising,
    means attached to said feedhorn for generating a beam of light,
    means for modulating said beam of light,
    means for receiving a modulated beam of light and providing an output voltage proportional to the amount of light receiver,
    means for rotating said means for receiving a modulated beam of light, and
    means for resolving said output voltage into a elevation error signal and an azimuth error signal, said signals being applied to said elevation servo and said azimuth servo, respectively, to drive said antenna.

3. A test apparatus for testing the elevation and azimuth servos of a radar antenna having a nutating feedhorn comprising,
    a light source attached to said feedhorn for generating a beam of light,
    a receiver for receiving said beam of light comprising a plate having deposited thereon an emulsion of variable density and a photo-electric tube for providing an output voltage proportional to the amount of light received from said light source,
    means for moving said receiver in an arcuate path, and
    means for resolving said output voltage into an elevation error signal and an azimuth error signal, said signals being applied to said elevation servo and said azimuth servo, respectively, to drive said antenna.

4. A method of testing the elevation and azimuth servos of a radar antenna comprising,
    generating a beam of light from a source on an antenna feedhorn,
    nutating said feedhorn thereby causing nutation of said beam of light,
    modulating said beam of light,
    providing a moving receiver for receiving said modulated beam of light and providing an output voltage proportional to the amount of light received, and then
    resolving said output voltage into an elevation error signal and an azimuth error signal whereby said signals are applied to the elevation servo and azimuth servo, respectively, to drive said antenna and track said moving receiver.

References Cited in the file of this patent

UNITED STATES PATENTS

| | | |
|---|---|---|
| 2,952,779 | Talley | Sept. 13, 1960 |
| 2,982,859 | Steinbrecher | May 2, 1961 |